Feb. 11, 1958     O. J. MOYER     2,823,302
MOVABLE LAMP CARRIER
Filed Feb. 4, 1954
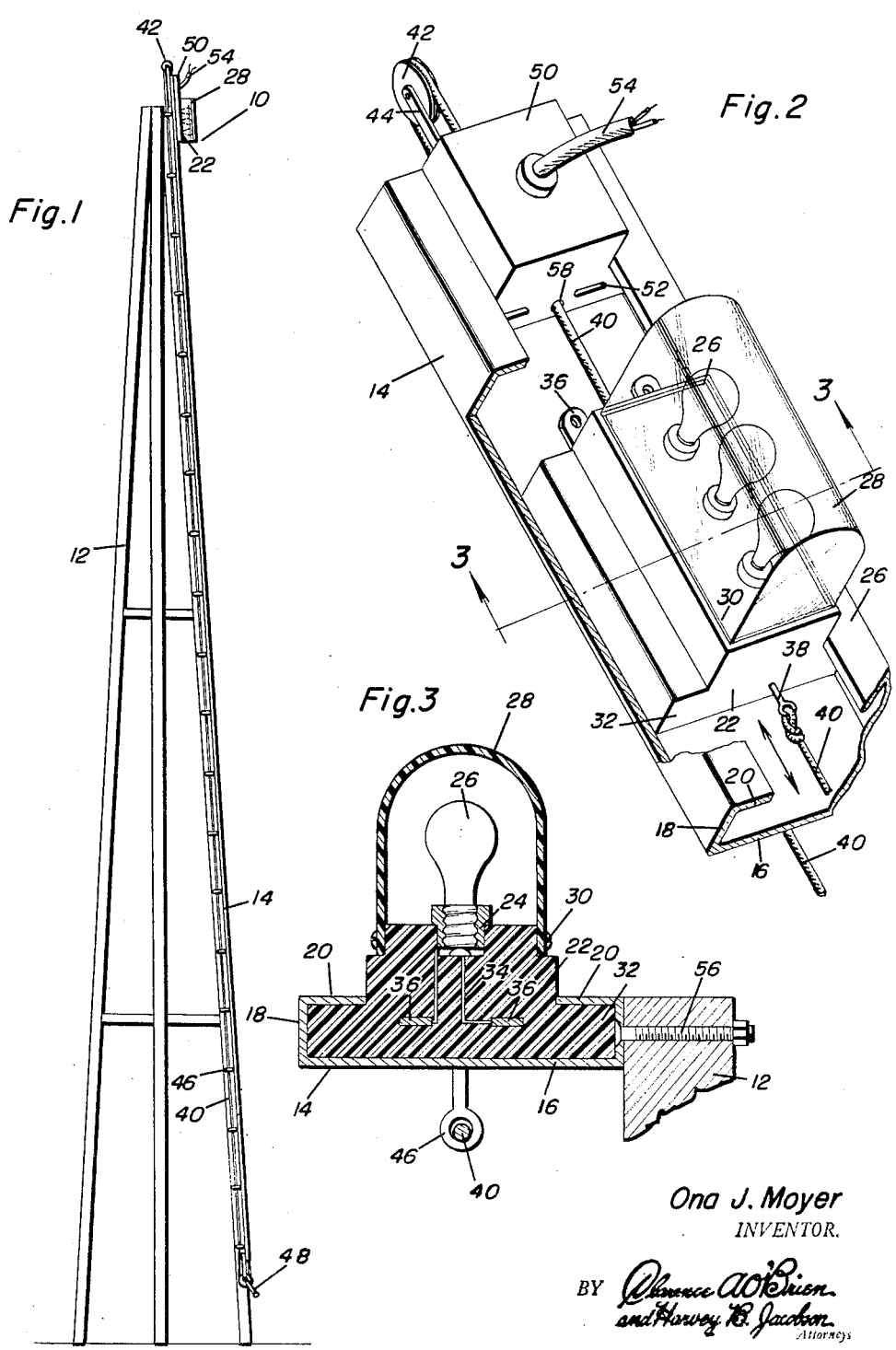
Ona J. Moyer
INVENTOR.

United States Patent Office 2,823,302
Patented Feb. 11, 1958

2,823,302

MOVABLE LAMP CARRIER

Ona J. Moyer, Stinnett, Tex.

Application February 4, 1954, Serial No. 408,164

1 Claim. (Cl. 240—65)

This invention relates to a movable lamp carrier and more specifically provides a device for raising and lowering light bulbs to a vertical extended overhead position such as lights used for signalling or guiding aircraft or the like.

An object of this invention is to provide a movable lamp carrier that is slidably positioned in an elongated track member and a crank is provided for raising and lowering the lamp carrier.

Another object of this invention is to provide a movable lamp carrier which may be raised and lowered and which automatically breaks and completes the electrical circuit for the light bulbs when the carrier is raised and lowered.

A further object of this invention is to provide a movable lamp carrier having a water-proof transparent cover over the light bulbs which may be removed for replacement of the bulbs.

Still another important object of this invention is to provide a movable lamp carrier which is simple in construction, easy to operate, rugged in construction, well adapted for its purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the movable lamp carrier of the present invention mounted on a suitable tower such as that used for indicating and warning approaching planes of the tower;

Figure 2 is a detailed perspective view showing the movable lamp carrier, the track which guides the carrier and the block at the upper end of the track showing the connecting and disconnecting means for energizing the light bulbs; and Figure 3 is a detailed transverse section taken substantially along section line 3—3 of Figure 2 showing the details of construction of the carrier and the light socket.

Referring now specifically to Figure 1, it will be seen that the numeral 10 generally designates the movable lamp carrier of the present invention mounted upon a vertically extending tower 12 such as those usually employed to indicate and guide approaching aircraft when visibility is poor. These clearance and warning lights must be periodically renewed in order to assure proper operation of the light.

Referring now specifically to Figures 2 and 3, it will be seen that an elongated track generally indicated by the numeral 14 is secured to one of the members of the vertical tower 12. The track 14 is generally channel shaped and includes a web portion 16, an upstanding flange 18 at each longitudinal edge of the web 16 and inturned flanges 20 at the upper edge of each upstanding flange 18 thereby forming a track for slidably guiding and retaining a carrier 22. The carrier 22 includes a plurality of sockets 24 for receiving light bulbs 26 wherein the light bulbs 26 may be replaced as desired. A transparent water-proof cover 28 is positioned over the bulbs 26 and secured to the carrier 22 by suitable fastening means 30. It will be seen in Figure 3 that the carrier 22 has a pair of projecting flanges 32 for engagement under the flanges 20 for sliding movement along the track 14. A pair of electrical conduits 34 is secured at one end to the socket 24 and at their other ends to respective pegs 36 which project outwardly at one end of the carrier 22. An eye member 38 is secured to each end of the carrier 22 and a flexible line 40 is tied to the eye member 38 by a suitable knot or other means. A pulley 42 is positioned at each end of the track 14 by suitable brackets 44 and the elongated flexible line 40 is passed over these pulleys 42 and is guided along the rear of the web 16 by suitable eye members 46 which are longitudinally spaced along the under or rear surface of the web 16 of the track 14. The bottom pulley 42 is provided with a handle 48 secured thereto for rotating the pulley 42 and moving the flexible line 40 thereby moving the carrier 22 along the track 14 in an obvious manner. At the upper end of the track 14 is provided a block 50 which forms a closure for the upper end of the track 14 and is provided with a pair of sockets 52 for selectively receiving the projections or prongs 36 on the carrier 22. A suitable electrical conduit 54 is connected to the block 50 and a suitable power source wherein electrical energy is distributed through the prongs 36 to the light sockets 24 and light bulbs 28 thereby illuminating the light bulbs 26 in the desired manner.

The operation of the device will be readily understood. With the flexible line 40 passed over the pulleys 42 and secured to the carrier 22 by use of the eye member 38, the carrier 22 may be moved along the track 14 by manipulation of the crank handle 48. When the carrier 22 is lowered to its lowermost position, the transparent cover 28 may be removed thereby permitting the light bulbs 26 to be renewed as desired. As the carrier 22 is moved upwardly along the track 14 by manipulation of the crank handle 48, the projecting prongs 36 are engaged in the sockets 52 thereby engaging contacts within the block 50 and completing the circuit from the electrical conduit 54 to the light bulbs 26 thereby illuminating the bulbs 26. Obviously, the transparent member 28 may be made of suitable glass or plastic and the carrier 22 may be constructed of any well known material and preferably of insulating material. It will be seen that the electrical circuit will be broken when the carrier 22 is lowered. It will be seen that the device of the present invention greatly facilitates the replacement of the light bulbs 26 such as those used in plane clearance warning systems or other lights situated atop a vertically extending tower, pole or the like. As specifically illustrated, the track 14 in this specific case is held to the tower 12 by suitable bolt members 56 passing through one of the vertical flanges 18 thereby leaving the rear surface of the web 16 free for reception of the guide eye members 46.

It will be seen that the block 50 is provided with a longitudinal bore 58 extending therethrough for slidably receiving the flexible line 40 and guiding the movement thereof onto the pulley 42 thereby preventing the pulley 42 and the line 40 from becoming disengaged.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A signal light comprising a generally vertically disposed support member, an elongated channel-shaped track, means for attaching the track to the support member, said track having inturned flanges on the free edges of the legs thereof, said attaching means mounting one leg of the track against the side of said support member with the front and rear of the track being free, a carrier slidably mounted in said track with portions of the longitudinal edges of the carrier underlying the inturned flanges on the track, said carrier being constructed of insulating material with a pair of parallel rigid longitudinal conductors embedded in said carrier and projecting from the upper end thereof, a lamp socket on said carrier and electrically connected with said conductors, a transparent removable weather proof cover for the outer surface of the carrier for enclosing the socket and lamp positioned therein, an eye member secured to each end of said carrier, a block forming a closure for the upper end of the track, said block having a pair of sockets in alignment with the conductors on the carrier for receiving the projecting ends thereof when the carrier is disposed at its upper limit of movement in engagement with the block, an electrical supply conduit connected to the block and electrically connected to the pair of sockets for supplying electrical energy to the lamp socket when the projecting ends of the conductors are received in the pair of sockets in the block, said block having a longitudinal bore in alignment with the eye members on the carrier, a pulley mounted at each end of the track, a flexible line entrained over said pulleys with one end being terminally secured to the eye member on the lower end of the carrier, the other end portion of the line being terminally secured to the eye member on the upper end of the carrier and passing through said bore with the bore acting as a guide for the line, handle means on the lower pulley for rotation thereof and movement of the carrier in the track, and guide members disposed rearwardly of the track for guiding the flexible line between the upper and lower pulleys.

References Cited in the file of this patent
UNITED STATES PATENTS

| | | |
|---|---|---|
| 310,728 | Schuette | Jan. 13, 1885 |
| 2,303,626 | Farrington | Dec. 1, 1942 |
| 2,364,155 | Martineau | Dec. 5, 1944 |
| 2,618,454 | Farrington | Nov. 18, 1952 |